US011201882B2

(12) United States Patent
Mirsky et al.

(10) Patent No.: US 11,201,882 B2
(45) Date of Patent: Dec. 14, 2021

(54) DETECTION OF MALICIOUS NETWORK ACTIVITY

(71) Applicants: NEC Corporation Of America, Herzlia (IL); B.G. Negev Technologies & Applications Ltd., at Ben-Gurion University, Beer-Sheva (IL)

(72) Inventors: Yisroel Avraham Mirsky, Beer-Sheva (IL); Oleg Brodt, Beer-Sheva (IL); Asaf Shabtai, Hulda (IL); Yuval Elovici, Arugot (IL); Masayuki Nakae, Herzliya (IL)

(73) Assignees: NEC Corporation Of America, Herzlia (IL); B.G. Negev Technologies & Applications Ltd., at Ben-Gurion University, Beer-Sheva (IL)

(*) Notice: Subject to any disclaimer, the term of this patent is extended or adjusted under 35 U.S.C. 154(b) by 414 days.

(21) Appl. No.: 16/203,681

(22) Filed: Nov. 29, 2018

(65) Prior Publication Data

US 2019/0166144 A1   May 30, 2019

Related U.S. Application Data

(60) Provisional application No. 62/592,441, filed on Nov. 30, 2017.

(51) Int. Cl.
| | |
|---|---|
| *H04L 29/06* | (2006.01) |
| *G06N 20/00* | (2019.01) |
| *H04L 29/08* | (2006.01) |
| *H04W 4/70* | (2018.01) |
| *H04W 12/122* | (2021.01) |

(52) U.S. Cl.
CPC ......... *H04L 63/1425* (2013.01); *G06N 20/00* (2019.01); *H04L 63/1416* (2013.01); *H04L 67/12* (2013.01); *H04W 4/70* (2018.02); *H04W 12/122* (2021.01)

(58) Field of Classification Search
CPC .................................................. H04L 63/1425
See application file for complete search history.

(56) References Cited

U.S. PATENT DOCUMENTS

| | | | | |
|---|---|---|---|---|
| 7,574,409 | B2* | 8/2009 | Patinkin | G06Q 10/107 |
| | | | | 706/12 |
| 10,460,255 | B2* | 10/2019 | Nagaraju | G06F 11/3006 |
| 10,469,514 | B2* | 11/2019 | Wang | G06F 21/552 |
| 10,552,609 | B2* | 2/2020 | Zhang | H04L 63/145 |

* cited by examiner

*Primary Examiner* — Simon P Kanaan (57) ABSTRACT

A method of monitoring network traffic in a communication network with a sentinel module to detect malicious activity is described. A gateway sentinel module receives network traffic directed through a gateway installed for a local distribution of the network, the gateway connecting the local distribution of the network to a core of the network. Malicious activity in the local distribution is detected based on a combination of: a local machine-learning model for identifying malicious activity in the local distribution, the local machine-learning model modelling network traffic from the local distribution; and a global machine-learning model. The global machine-learning model models network traffic from a plurality of local distributions of the network based training data from a plurality of local sentinel modules executed on a respective plurality of computing nodes. The computing nodes respectively receive network traffic from the plurality of location distributions. A corresponding device and system are also described.

23 Claims, 7 Drawing Sheets

DETECTION OF MALICIOUS NETWORK ACTIVITY

RELATED APPLICATION

This application claims the benefit of priority under 35 USC § 119(e) of U.S. Provisional Patent Application No. 62/592,441 filed on Nov. 30, 2017. The contents of the above application are all incorporated by reference as if fully set forth herein in its entirety.

FIELD AND BACKGROUND OF THE INVENTION

The present invention relates to the field of network attacks. More particularly, but not exclusively, the present invention relates to a method, device and system for detecting, and in some embodiments preventing, network attacks in distributed networks in general. In some embodiments the distributed network is an Internet-of-Things (IoT) network.

An exemplary topology for a cloud-based IoT network may constitute the following elements:

Local distributions of IoT devices: The IoT devices may be grouped by a subnet in which they are located. The subnet may comprise one or more Local Area Networks (LANs). For example, the IoT devices may be all the devices in a smart home. These devices are connected, via a local gateway (i.e., router) in the local network, to core of the network, e.g., a Wide Area Network (WAN) such as the Internet, to access the Cloud Services.

Cloud Services: The Cloud Services are provided by a server and/or local network of servers that are setup and connected to wider network (e.g., the Internet). The server(s) provide users with services in relation to their IoT devices. Such services provide, for example, a means for communicating with IoT devices and monitoring their status.

The unfolding era of the Internet of Things (IoT) will blur the line between physical and virtual domains, whereby online cyber-attacks will (and already) have the ability of spilling-over the damage that they create into our physical world. Taking into account the fact that there are billions of IoT devices expected to be connected to the Internet in the near future, the severity of this threat calls for instantaneous action.

SUMMARY OF THE INVENTION

A first aspect of the present invention provides a method of monitoring network traffic in a communication network with a sentinel module to detect malicious activity. The method comprises using a gateway sentinel module to receive network traffic directed through a gateway installed for a local distribution of the network. The gateway connects the local distribution of the network to a core of the network. The method also comprises detecting malicious activity in the local distribution. The detection is based on a combination of a local machine-learning model and a global machine learning model.

The local machine-learning model is for identifying malicious activity in the local distribution, the local machine-learning model modelling network traffic from the local distribution. The global machine-learning model models network traffic from a plurality of local distributions of the network based training data from a plurality of local sentinel modules executed on a respective plurality of computing nodes. The computing nodes respectively receive network traffic from the plurality of location distributions.

In some embodiments, the method further comprises training the local machine-learning model based on received network traffic directed through a gateway.

In some embodiments, the training the local machine-learning model comprises at least one of: deriving the local machine-learning model based on training data extracted from network traffic directed through a gateway; and updating the local machine-learning model based on training data extracted from network traffic directed through a gateway.

In some embodiments, the local machine learning model models network traffic from the local distribution by mapping, for at least one type of device connected to the gateway, a characteristic of traffic from the device.

In some embodiments, detecting malicious activity based on a combination of the local model and the global model comprises determining a first correlation score based on a correlation between received traffic and the local model. In an event that the first correlation score satisfies a first predefined criterion, a second correlation score is determined. The second correlation score is based on a correlation between received traffic and at least the global model. In an event that the second correlation score satisfies a second predefined criterion, it is decided that the traffic is at least potentially malicious. In some embodiments, the second correlation score is additionally based on a correlation between received traffic and the local model.

In some embodiments, detecting malicious activity based on a combination of the local model and the global model comprises: determining a first correlation score based on a correlation between received traffic and the local model; determining a second correlation score based on a correlation between received traffic the global model; and combining the first correlation score and the second correlation score. In an event that the combined correlation score satisfies a predefined criterion, it is decided that the traffic is at least potentially malicious.

In some embodiments, the method comprises receiving the global machine-learning model from a remote computing node connected a Wide Area Network. The remote computing node uses a remote sentinel module to manage the global machine-learning. The remote computing node is outside the local distribution. In some embodiments, the method comprises maintaining the global machine-learning model in the remote computing node.

Maintaining the global machine-learning model comprises updating the machine learning-model based on the training data. In some embodiments, the method comprises: receiving, at the remote computing node, network traffic from each of the plurality of computing nodes; and based on the global machine-learning model, detect malicious activity of the received network traffic from any one of the local distributions. The method further comprise: based on at least the local machine-learning module, detecting unusual network activity in network traffic received by the gateway sentinel module; and transmitting data relating to the unusual network activity to the remote computing node.

In some embodiments, the method comprises: extracting a parameter set from network traffic received by the gateway sentinel module; and based on a relationship between the parameter set and at least the local machine learning model, deciding whether the network traffic from which the parameters was extracted is malicious. In some embodiments, the decision is based on an estimated probability of the parameter set occurring from non-malicious network activity. In some embodiments, the extracted parameter set may comprise at least one of: packet-rate; data-rate; and a highest frequency component of a frequency spectrum of the received data. In some embodiments, the parameter set consists of packet-rate.

In some embodiments, the training data for maintaining the local-machine learning model comprises data from at least one device communicating with an Internet-of-Things (IoT) service.

In some embodiments, the received network traffic is Internet-of-Things (IoT) traffic.

In a second aspect of the present invention there is provided a communications device for monitoring network traffic in a communication network to detect malicious activity. The device comprises: a communications module for receiving network traffic between a core of the network and devices in a local distribution of the network; a memory for storing computer readable instructions; and a processor for executing the instructions. Upon executing the instructions, the processing is configured to detect malicious activity in the local distribution. The detection is based on a combination of a local machine-learning model and a global machine learning model. The local machine-learning model is for identifying malicious activity in the local distribution, the local machine-learning model modelling network traffic from the local distribution. The global machine-learning model models network traffic from a plurality of local distributions of the network based training data from a plurality of local sentinel modules executed on a respective plurality of computing nodes, the computing nodes respectively receiving network traffic from the plurality of location distributions.

In some embodiments, detecting malicious activity based on a combination of the local model and the global model comprises any one of the following two options. The first option is to determine a first correlation score based on a correlation between received traffic and the local model. In an event that the first correlation score satisfies a first predefined criterion, a second correlation score is determined. The second correlation score is based on a correlation between received traffic and at least the global model. In an event that the second correlation score satisfies a second predefined criterion, it is decided that the traffic is at least potentially malicious. The second option is to determine a first correlation score based on a correlation between received traffic and the local model, and determining a second correlation score based on a correlation between received traffic the global model.

The first correlation score and the second correlation score are combined, and in an event that the combined correlation score satisfies a predefined criterion, it is decided that the traffic is at least potentially malicious.

In some embodiments, the processor is further configured to receive the global machine-learning model from a remote computing mode connected a Wide Area Network, the remote computing using a remote sentinel module to manage the global machine-learning, the remote computing node being outside the local distribution.

In some embodiments, the processor is further configured to: based on at least the local machine-learning module, detect unusual network activity in the network; and transmit data relating to the unusual network activity to the remote computing node.

In a third aspect of the present invention there is provided a method of monitoring network traffic in a communication network with a sentinel module to detect malicious activity. The method comprises using a global sentinel module to receive network traffic between an Internet-of-Things (IoT) servicing system to a core of the network to communicate with IoT devices on a plurality of local distributions of the network. From the received network traffic, a global machine-learning model modelling network traffic is trained from a plurality of local distributions of the network. The global sentinel model is transmitted to at least one of the local distributions for detecting malicious activity in the distribution based on a combination of the global machine-learning model and a local machine-learning model modelling network traffic from the local distribution.

In some embodiments, the method further comprises verifying performance of the global sentinel model prior to transmitting the global sentinel model to the at least one of the local distributions. Verifying the performance comprises: classifying the network traffic between the IoT servicing system and at least one of the local distributions based on a combination of the local machine-learning model and the global machine-learning model; and in an event that the classification meets a predefined condition, determining that the classification is correct.

In a fourth aspect of the present invention there is provided a device for monitoring network traffic in a communication network to detect malicious activity. The device comprises a memory for storing computer readable instructions, and a processor for executing the instructions. Upon executing the instructions, the processor is configured to use a global sentinel module to receive network traffic between an Internet-of-Things (IoT) servicing system to a core of the network to communicate with IoT devices on a plurality of local distributions of the network.

The processing is configured to, from the received network traffic, train a global machine-learning model modelling network traffic from a plurality of local distributions of the network. The processing is configured to instruct transmission of the global sentinel model to at least one of the local distributions for detecting malicious activity in the distribution based on a combination of the global machine-learning model and a local machine-learning model modelling network traffic from the local distribution.

In a fifth aspect of the present invention there is provided method of monitoring network traffic in a communication network with a sentinel module to detect malicious activity. The method comprises receiving network traffic between a servicing system and a local distribution of the network; and detecting malicious activity in the received network traffic. The detection is based on a combination of a local machine learning model and a global machine learning model. The local machine-learning model is for identifying malicious activity in the local distribution, the local machine-learning model modelling network traffic from the local distribution. The global machine-learning model models network traffic from a plurality of local distributions of the network based training data from a plurality of local sentinel modules executed on a respective plurality of computing nodes, the computing nodes respectively receiving network traffic from the plurality of location distributions.

In a sixth aspect of the present invention there is provided a device for monitoring network traffic in a communication network to detect malicious activity. The device comprises a memory for storing computer readable instructions, and a processor for executing the instructions. Upon executing the instructions, the processor is configured to receive network traffic between a servicing system and a local distribution of the network; and detect malicious activity in the received network traffic. The detection is based on a combination of a local machine learning model and a global machine learning model. The local machine-learning model is for identifying malicious activity in the local distribution, the local machine-learning model modelling network traffic from the local distribution. The global machine-learning model models network traffic from a plurality of local distributions of the network based training data from a plurality of local sentinel modules executed on a respective plurality of computing nodes, the computing nodes respectively receiving network traffic from the plurality of location distributions.

To the extent possible, each of the embodiments of the first, third and fifth aspects of the invention are also applicable to the second, fourth and sixth aspects of the present invention.

In a seventh aspect of the present invention there is provided a system comprising or more devices according to the second aspect of the present invention and a device that is in accordance with the fourth and/or sixth aspects of the present invention.

In an eighth aspect of the present invention there is provided a non-transient computer readable medium storing instructions for execution by a processor wherein execution of the instructions by the processor causes the processor to perform the method according to any one of the first, third or fifth aspects of the present invention.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system.

In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well.

The data processor, also referred to herein using the stand-alone term 'processor', may be single processing component, e.g., a microprocessor, or may be comprised of a plurality processing components which share the processing tasks, e.g., a processing system having a plurality of microprocessors. As used herein, the term 'memory' as stand-alone term may be a single memory element or may be multiple elements, and may comprise volatile memory, non-volatile memory or both. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention relates to the field of network attacks. More particularly, but not exclusively, the present invention relates to a method, device and system for detecting, and in some embodiments preventing, network attacks in distributed networks in general. In some embodiments the distributed network is a network that includes Internet-of-Things (IoT) devices and backend IoT servers In general terms, non-limiting on the scope of the invention, there is described a method, device and system by detecting of malicious activity in a local distribution of a network based on a combination of a local machine-learning model and a global machine-learning model. The local model may identify malicious network activity in the local distribution based on learned knowledge of the normal behavior of devices in the local distribution. The global model, on the other hand, is based in a Wide Area Network (WAN) to learn the behavior of devices connected to multiple local distributions of the network, thereby providing a broader-context model to complement the local model.

For example, a parameter set may be extracted from network traffic received by a gateway sentinel module that receives traffic between the local distribution and a core of the WAN, and based on a relationship between the parameter set the local and global machine learning models, it may be decided whether the network traffic from which the parameters was extracted is malicious. The decision may be based on an estimated probability of the parameter set occurring from normal network activity, given the learned behavior of the connected devices.

In some embodiments, detecting malicious activity based on a combination of the local model and the global model comprises: determining a first correlation score based on a correlation between received traffic and the local model; and in an event that the first correlation score satisfies a first predefined criterion (e.g., being less than a first threshold), determining a second correlation score. The second correlation score may be based on a correlation between received traffic and at least the global model. In an event that the second correlation score satisfies a second predefined criterion, it is decided that the traffic is at least potentially malicious. The second predefined condition may be that the second correlation score is less than a second threshold which, optionally, may be the same as the first threshold. Optionally, the second correlation score may additionally be based on a correlation between received traffic and model.

In other embodiments, detecting malicious activity based on a combination of the local model and the global model comprises: determining a first correlation score based on a correlation between received traffic and the local model; and determining a second correlation score based on a correlation between received traffic the global model. The first correlation score and the second correlation score are then combined (e.g., by multiplication). In an event that the combined correlation score satisfies a predefined criterion (e.g., being less than a threshold), it is decided that the traffic is at least potentially malicious.

It will be appreciated by a person skilled in the art the detection of whether network traffic is malicious is based on statistical methods which inherently involve a degree of uncertainty. Therefore where the specification refers to detecting or deciding that there is malicious activity is will be understood that this is a decision to classify the activity as at least potentially malicious.

An exemplary system, in accordance with an aspect of the invention and which will be described hereinafter, comprises two main elements, namely a Local Sentinel (LS) and a Remote Sentinel (RS). The Local Sentinel executes a module (software instructions and data) that maintains the local machine-learning model and that monitors traffic between the local network and the wider network based on the model. Thus, there may be multiple instances of LSs, one for each local network of IoT devices. The Remote Sentinel is cloud based and executes a module that maintains the global machine-learning model and that uses that model in monitoring traffic between the IoT cloud server(s) and each of the local networks of IoTs.

The local model is trained from data from devices on the corresponding local network of IoTs, while global model is derived from data from all of the IoT devices on all of those local distributions, so provides a broader context model. In the embodiments described herein, the LS monitors and protects against cyber security by using both its own machine-learned model and also the RS's machine-learned model.

Exemplary embodiments of the present invention will now be described in more detail with reference to the figures.

Figure 1:
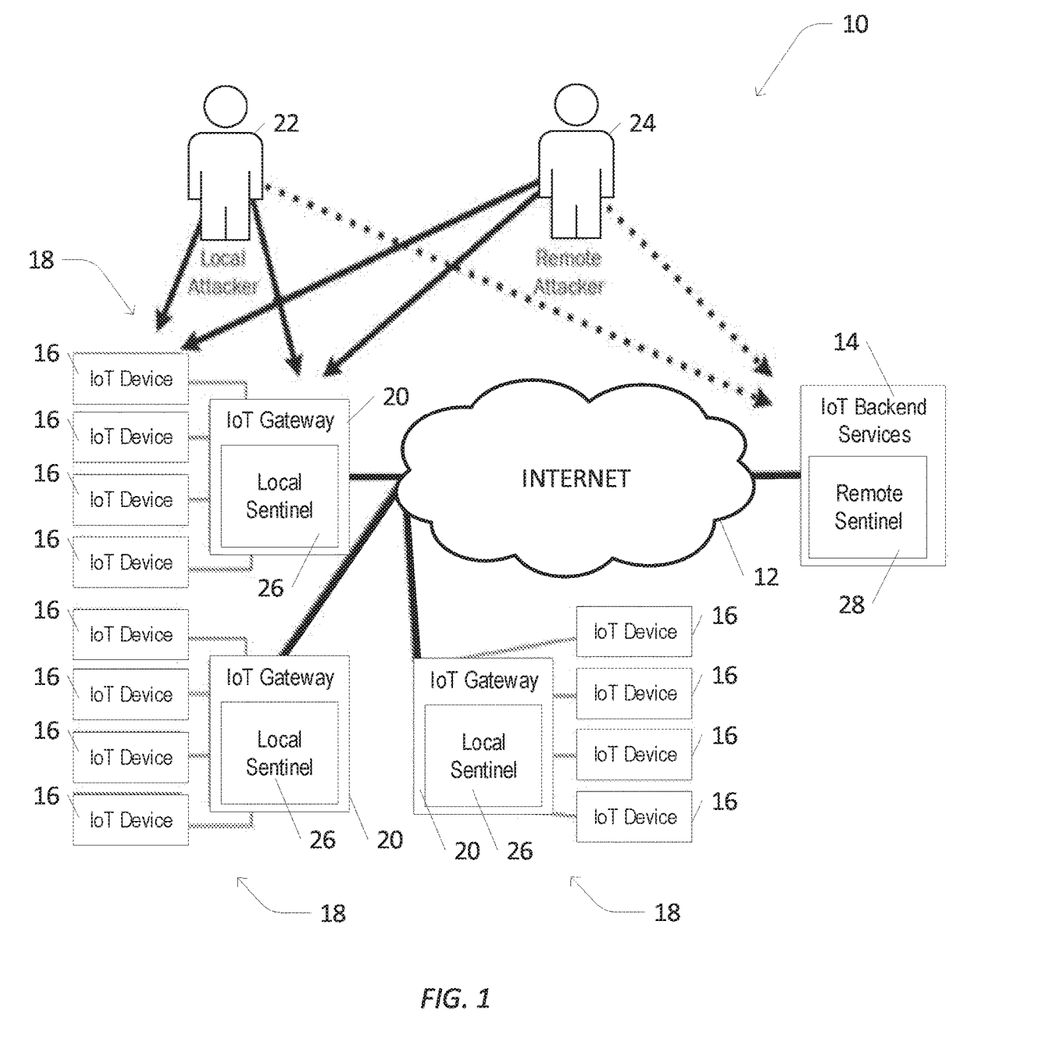
FIG. 1 is a diagram of an exemplary network using a system for monitoring network traffic to detect malicious activity, in accordance with an aspect of the invention.

FIG. 1 illustrates a distributed network, which in this example is an Internet-of-Things (IoT) network 10 that utilizes the infrastructure of a Wide Area Network (WAN) in the form of the Internet 12. The IoT network 10 uses backend IoT servers 14 to service IoT devices 16 connected to local distributions 18. The various local distributions 18 may be respective subnets of the network 10, whereby the local distributions are connected to the WAN 12 by respective gateways 20, namely routers. In some embodiments, at least some of subnets comprise multiple LANs. In the following description of exemplary embodiments, the term 'local distribution' refers to a LAN, but it will be appreciated that each of the exemplary embodiments equally apply to cases in which the or each local distribution comprises a plurality of LANs. In FIG. 1, all of the devices connected to the gateways are IoT devices that communicate with the backend IoT servers 14. Such devices may include, for example, video or other cameras, Digital Video Recorders (DVRs), and/or security systems, to name a few.

In some embodiments, non-IoT devices, such as PC's, laptops etc., may also be connected to the gateways. In some embodiments in which non-IoT devices are connected to the gateways, any network traffic through the gateway that is not part of a communication with the IoT servers 14 is ignored by the LSs, for example it may be filtered according to its source and/or destination IP address.

The network is susceptible to cyber-attacks by a local attacker 22 or a remote attacker 24. For example, the attacker may infect one or more IoT devices 16 behind a given in a given subnet and/or LAN 18 with some malware, causing the IoT device(s) to be part of a botnet (e.g., Mirai). The botnet then begins to communicate with its command and control center, or even launch a DDoS attack. All traffic from the bots towards the internet (WAN) passes through gateways 20, and may thereby be intercepted at the gateways 20.

To help guard against malicious traffic, sentinel modules are installed on various computing nodes of a plurality of local distributions of the network 10, each computing node receiving network traffic from a different local distribution. A local sentinel module (also referred to herein as a gateway sentinel module) is installed in a communications device that is placed in a local network 28. The communications device may be the gateway 20 or a part of the gateway, or may be a device that is near gateway 20 and configured to receive all network traffic that passes through the gateway 20. Hardware that stores and executes the local sentinel module is referred to herein a Local Sentinel (LS) 26. The LS 26 monitors in-going and out-going traffic to detect local attacks in the local network by using known rules and machine learning, and may trigger an alert or drop (filter) the malicious packets. Each LS 26 manages a local machine learning model $M_L$, matched to the profile and behavior of the local deployment of IoT devices of the given LS 26.

Using the local machine learning model LS, the LS 26 may act as a stand-alone security solution, but security is strengthened by leveraging a high-level situational perspective derived from the Remote Sentinel (RS) 28. This is accomplished by using a global model $M_G$, from the RS, in conjunction with the local model $M_L$. The global model $M_G$ is provided by the RS 28, having been derived by the RS based on high-level observations inferred from one or more local sentinels. Alerts, logs, and interesting observations (i.e. unusual activity worth further investigation) are assembled by the LS 26 and sent to the RS 28 for further processing. The global model $M_G$ can additionally or alternatively be derived from a random sample of observed traffic, sent to the RS (e.g., one instance from every 10,000 observed by the LS).

The RS 28 is connected to the WAN, i.e. somewhere in the Internet cloud. The RS 28 acts as a security information and event management (STEM) system that provides a situational overview of the Local Sentinels and ongoing attacks. Installed on the RS 28 is a remote sentinel module that manages a global machine learning model (either a single model or an ensemble of models) that captures emerging threats in the network, based on the information shared by the LSs 26. The RS may be included in, or connected to, a gateway for connecting backend server(s) to the WAN 12. Optionally, if all servicing traffic passes through a single server, the function of the RS may optionally be provided by configuring the server to execute the remote sentinel module. LSs 26 may download this global model to enhance the accuracy of their detection algorithms, and strengthen their machine learning systems against machine learning attacks (e.g., model poisoning).

Figure 2:
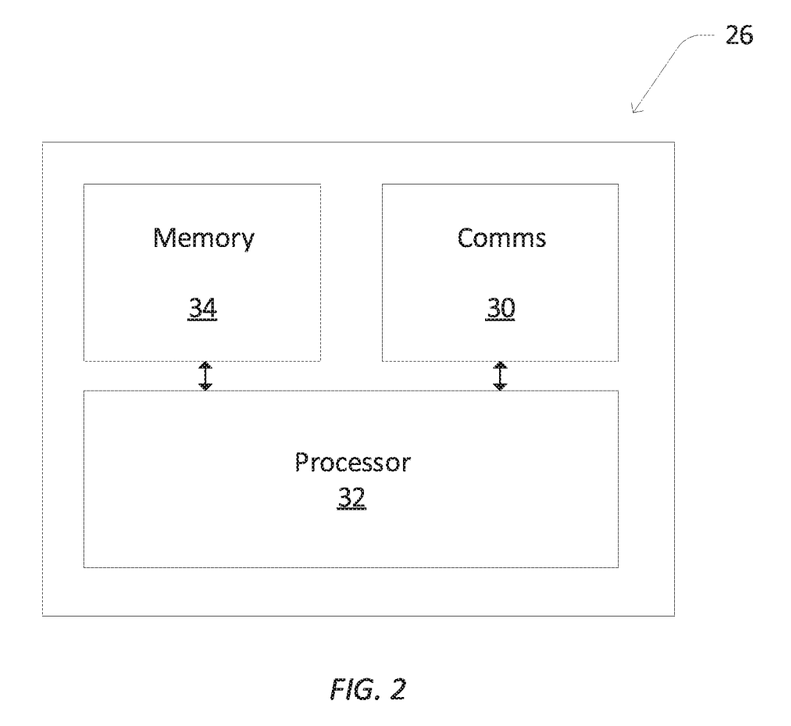
FIG. 2 is a block diagram depicting conceptual components of a communications device in accordance with an aspect of the present invention.

Block diagrams of the hardware components of the LS and RS are illustrated in FIG. 2 for the case where LS is included in a gateway 26. As discussed, the RS may also be included in a gateway for the backend server(s), so the architecture described in FIG. 2 may also be used for the RS.

In this embodiment of the LS, the gateway 26 may be any standard gateway or IoT gateway with capabilities to run customized application software. For example, the gateway 26 includes a communications unit 30 for interfacing with the devices 16 in the corresponding LAN and for interfacing with the WAN 12. The communications unit it controlled by a processor 32 which operates based on instructions that are stored in non-volatile storage in a memory 34, along with an operating system and BIOS of the gateway. The instructions include instructions for performing the method of the present invention. A machine-learning model may also be stored, as data, in the non-volatile memory. In other embodiments the machine learning model may be stored in a separate device. The memory unit also includes volatile memory for transient data storage, e.g., as may be used during operation of the gateway 26. The sentinel module comprises instructions and data (e.g., the corresponding model), and may therefore be stored in the non-volatile memory.

In some embodiments, the LS may be near, but not part of, the gateway. In such embodiments, the LS may receive network traffic directed through the gateway by being connected to the gateway via a mirror port of the gateway.

Local Sentinel

Figure 3:
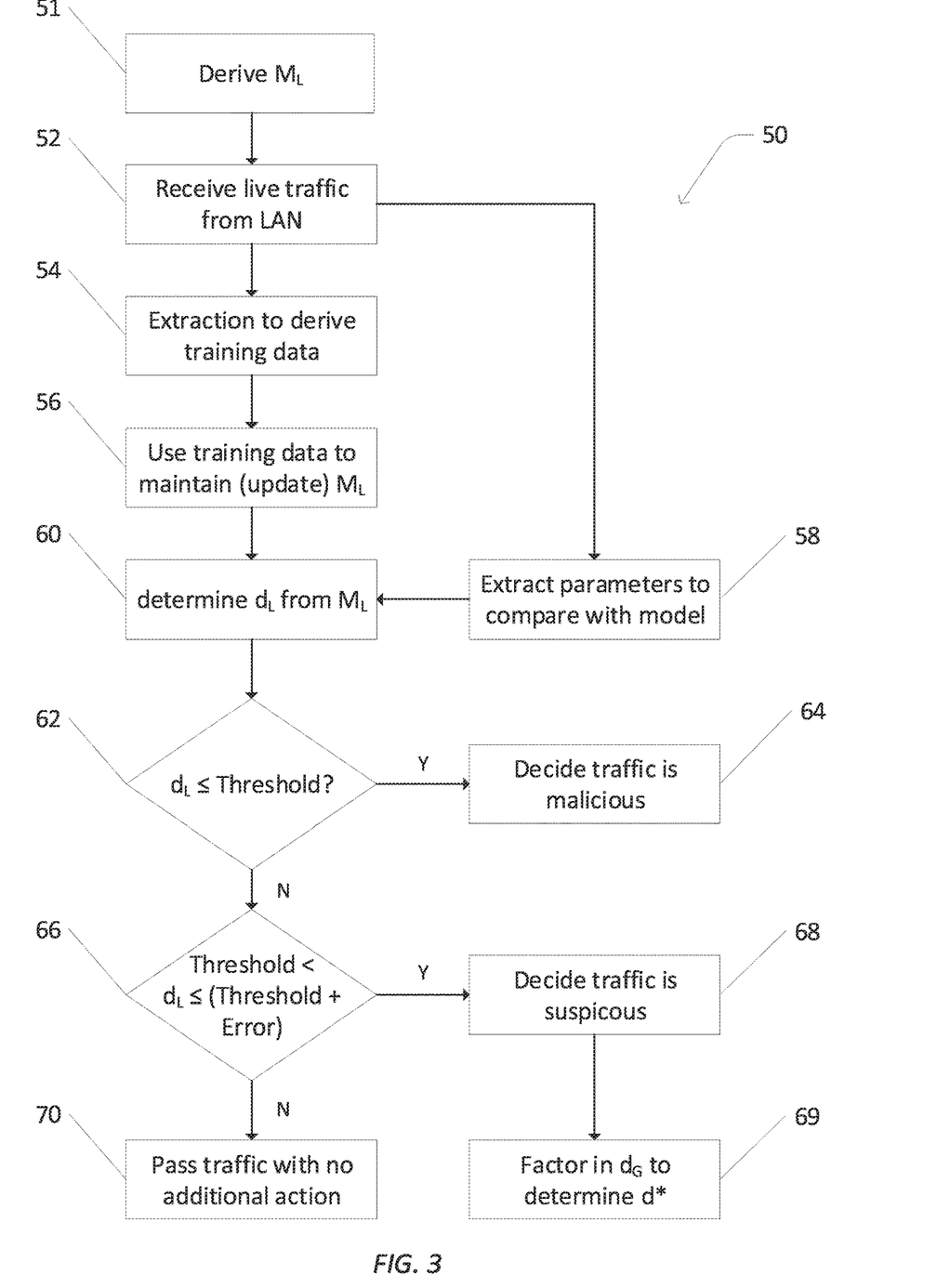
FIG. 3 is a flow diagram showing an exemplary method of monitoring network traffic based on a process for combining use of a local machine learning model and a global machine learning model, in accordance with an aspect of the present invention.

The LS 26 maintains a local machine-learning model of the network traffic traversing the local gateway 20 and uses the model to monitor network traffic through the gateway. FIG. 3 depicts a flow diagram of an exemplary method 50, performed by the processor of the LS 26, to perform these functions.

The Local Model

At step 51 of the method 50 the LS derives an initial version of the global model $M_L$ by batch or incremental on-site training from parameters extracted from traffic received from IoT devices 16 in its LAN 18. Once the global model $M_L$ has been trained for use, the LS 26 receives live traffic, at step 52, from the IoT devices 16 in the LAN 18. As will be described, in subsequent steps, the LS 26 extracts observations from the live traffic, and decides whether the present network packet should be passed, dropped, trigger an alert, or simply logged. In embodiments in which the LS is connected to the mirror port of a gateway, as opposed to be part of the gateway, the LS may trigger an alert or log the network packet, but does not filter (selectively drop or pass) the packet.

The LS accomplishes this by maintaining and using a machine learning model $M_L$. The model $M_L$ is trained on-site. At step 54, the LS extracts a set of parameters/features which form training data for the model $M_L$. these parameters being the same parameters used to initially derive the model $M_L$. All feature extraction and processing occurs on-site as well to thereby ensure real-time responses.

Exemplary parameter/features captured by the $M_L$, in some embodiments, includes the sending host's device model/type (e.g., a specific Sony camera model which exists in several locations throughout the entire network). The local machine learning model $M_L$ may be a single model (e.g., a neural network relating to all of the devices) or an ensemble of models whereby each model is associated with a different type of device. In exemplary embodiments, the input to the machine learning model is, in both cases, the model of the device. The model of the device is inferred from the class/category of device, based on the Organizationally Unique Identifier (OUI) of the MAC address, sent in every network packet.

For each type of device, $M_L$ models a characteristic of traffic from the device. The characteristic may a set of features extracted from the traffic. In some embodiments, the extracted features are at least one of: the sending host's (i.e., the device's) current packet rate, number of bytes transmitted per second, the largest frequency in the bandwidth rates from a Fast Fourier Transform, etc. In some embodiments, the characteristic may be a distribution of values for each of the features included in the model, for traffic that is non-malicious, or at least not known to be malicious.

At step 56, the extracted parameter/feature set is used to train the model $M_L$. $M_L$ may be an incremental machine learning model, or updated in the conventional batch approach. In exemplary embodiments, the local model $M_L$ may be a Gaussian Mixture Model (GMM). The model may be used to calculate a correlation score $d_L$ (e.g., a certainty score or, conversely, an anomaly score) for parameters extracted from new network traffic, using a well-known approach (probability distributions, or distance from decision boundary—e.g., SVM margin, etc.). For example, the probability of observing a certain set parameters in new traffic may be calculated in view of those parameters in the previous traffic, which was used to train the machine-learning model.

In embodiments described hereinafter, the model $M_L$ is trained on packet rates, i.e. the number of packets second sent, by any one device, via the LS. The correlation score used in these examples represents the probability $p(r_t)$ of observing a given packet rate $r_t$, based on a correlation between the observed packet rate and the model $M_L$. However, it will be appreciated that a parameter set of other extracted features and score functions may be used, as discussed above.

Monitoring traffic based on the $M_L$

An exemplary use of one way for the LS 26 to use the model $M_L$ will now be described. In this example, the LS 26 is used to determine a locally-informed correlation score $d_L$, which is used for handling of received traffic (in this case one or more data packets) from a particular device 16 connected in the LAN 18 monitored by the LS 26.

At step 58, the LS extracts the parameter of interest from the received to compare with the model $M_L$. In this case, the parameter of interest is the packet rate $r_t$ received from a given device, as identified by its IP address, but optionally by its MAC address. At step 60, the LS 26 uses the model to firstly determine a correlation score $d_L$, in this case representing the probability $p(r_t)$ of observing that packet rate $r_t$ from any one device in the LAN.

At step 62, the LS compares the score to a threshold $\Phi_L$ to determine whether the received traffic is normal. In this example, the threshold $\Phi_L$ is chosen as an anomaly threshold of $1 \times 10^{-7}$, used as a cut-off probability. Although, optionally, some other low value of may be used as the threshold.

If the score $d_L$ is less than or equal to $\Phi_L$ then the LS decides at step 64 that the traffic is malicious and acts according to predefined rules for treating such traffic. For example, the data packets from the same MAC address may be at least temporarily filtered. Alternatively an alert may be transmitted to the RS 28, identity the packet as malicious and providing an observation associated with the alert, the observation being the calculated score. This then allows appropriate action to be taken by the RS or administrator of the backend services 14.

If the packet is not deemed malicious (i.e., $d_L$ is less than or equal to $\Phi_L$), the LS might nonetheless still take some action, depending on the circumstances. For example, during a DDoS attack, the packet rate is generally be very high, whereby $d_L$ is less than $\Phi_L$. However, in some instances, $r_t$ may resemble a normal packet rate, by being greater than $\Phi_L$, but not by much. In this case, it is unclear whether $d_L$ is indicative of a network attack.

Thus, at step 66, the LS checks whether $\Phi_L < d_L \leq \Phi_L + E$, where E is an error margin, which may optionally be set by a user. For example, E may be set to 0.001, if the scores represent a probability. Then at step 68, the LS identifies decides the traffic is suspicious, warranting further investigation. Then, at step 69, the LS conducts further investigation by employing the global model $M_G$. In particular, as will be described, the LS factors in the global model $M_G$ to make a final decision. As a result of the traffic having initially been identified as suspicious, the LS also sends an alert to the RS, identifying this traffic as being "interesting".

On the other hand, if $d_L > \Phi_L + E$, at step 70, the LS decides the traffic is normal and allows the traffic to pass without any other action.

In some embodiments, the LS only reports urgent conditions, such as drops and/or alerts, to the RS. In other embodiments, the LS also reports aggregated logs for the administrator to visualize the system's status via the RS. The logs may include, for example, CPU usage, number of packets seen so far, etc. The aggregated logs may concern non-urgent status or statistics and therefore need, and if sent do not need to be sent in real-time.

Remote Sentinel

The RS 28 monitors traffic going in and out of the cloud, between the devices 16 in the LANs 18 and a specific backend server(s) 14 for servicing those devices 16. The RS develops and maintains a global model (a remote model), $M_G$, by machine learning based in a similar manner to the LS's learning of its local model $M_L$.

The Global Model

The global model $M_G$ may have the same form as the local models $M_L$, i.e. a Gaussian mixture model based on the same parameters described in relation to $M_L$. However, the $M_G$ may be trained from data sets derived from a much larger pool of data because it is receives data communicated between the IoT backend servers 14 and the LAN based IoT devices 16, via the RS. For example, while a given LS might receive data from just one camera of a specific type (e.g., a specific Sony camera), the RS may receive data from many of devices of that type (e.g., that specific model of Sony camera may exist in several LANs in the network). The $M_G$ may also capture the behavior of many different models of devices and different kinds devices since the model $M_G$ is trained from data sent from all of the LSs 26. In this manner the $M_G$ may be used to provide a broader context to whether the observed traffic is unusual in light of the behavior of all of the different IoT instances observed in the network.

The RS also receives additional data from each of the LSs identifying various concepts gathered from other LS distributions, and stores this in a database.

These concepts are learned by the LS. They include the network patterns of various protocols or devices. For example, the 'normal' flow of a protocol may be seen more often by a first one of the LSs during training than by a second one of the LSs. This experience of the first LS is shared with the second LS via the global model from the RS.

The learning models of the RS and the various LSs can be based on identical or different algorithms. Any machine learning algorithm may be used for a given model, for example GMM, decision tree, or any statistical function(s). The models need to summarize the behavior of the given network packet's sender and receiver, and understand whether it is benign or malicious based on outlier analysis. The behavior can be defined by any input features—IP address, MAC address, frequency of packet transmission, used bandwidth, TCP/UDP ports of sender and/or receiver, and so on.

With this database, and the available computational resources in the cloud, the RS maintains (trains and updates) a strong model $M_G$.

In the example described hereafter, the global model $M_G$, like the local models $M_L$ is a Gaussian Mixture Model based on received packet rates. Thus, the RS may score and, if necessary, filter traffic using the global machine learning model $M_G$, in a similar way to the LS's use of its local model $M_L$, as described above.

Maintenance and Use of the Global Model $M_G$

Figure 4:
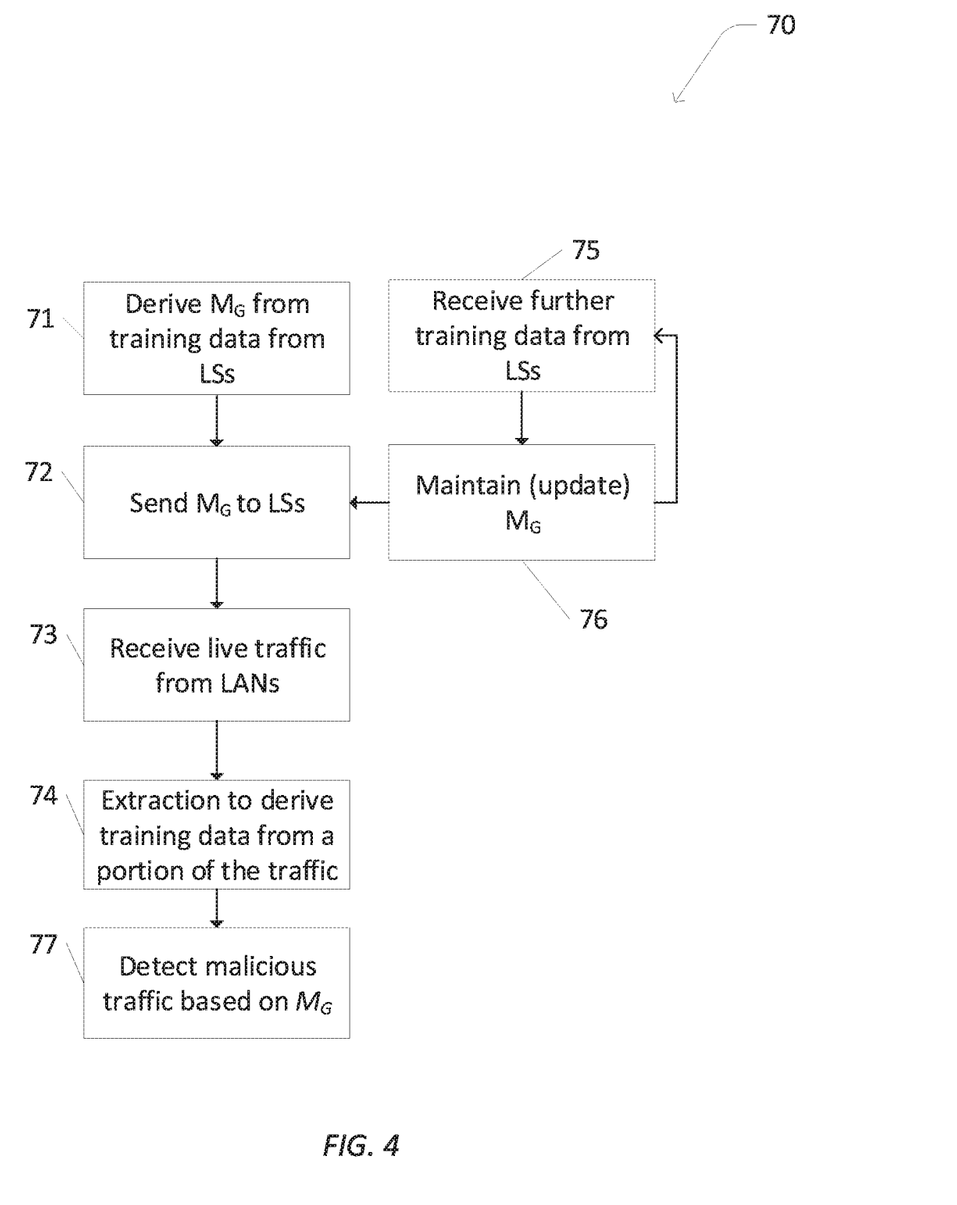
FIG. 4 is a flow diagram showing an exemplary method for maintaining the global machine-learning model and transmitted.

An exemplary method 70 for developing, maintaining and using the global model $M_G$ in the RS 28 is depicted in FIG. 4. At step 71 the RS derives an initial version of the global model $M_G$ by batch or incremental on-site training from training data.

In some embodiments, the training data may be parameters extracted from a portion of the traffic received from each of the LSs 26, the portion of traffic being randomly selected from traffic that has been classified by the LS as being "normal" (non-malicious). Optionally, only traffic having an especially low anomaly score, detected by using a "normal" threshold that is even lower than $\Phi_L$ is used to train $M_G$. By training $M_G$ with this "normal" data, $M_G$ is designed as an anomaly detector, so may operate using the same as described herein in respect of $M_L$.

In other embodiments, $M_G$, is trained from notifications of "interesting instances" of traffic received from the LSs. For such embodiments, each LS sends instances of traffic for which it is not sure whether the traffic is anomalous or not, as described herein. The RS uses this information to make a classifier.

Training data, of the form discussed above, continues to be received as depicted step 75 from the LSs, and the RS maintains (updates) $M_G$ based on the received training data, as depicted by step 76. Each time the RS is updated, or after a defined time has elapsed or condition is satisfied, the updated $M_G$ is transmitted to each LS, by repeating step 72.

The receipt of $M_G$ by the LS enables the LS to make decisions, concerning malicious activity, that have a broader context than by using the $M_L$ alone. As will be appreciated from the above description, the Local Sentinel and the Global Sentinel may use their local model and global model, respectively, to identify unusual behavior from a device in the network with which it is communicating. However, the local and global models may be combined to assist in the identification of unusual behavior, and therefore potentially malicious activity.

The global model $M_G$ may also be used by the RS 28 to detect malicious traffic passing by/through by the RS 28. Thus, the RS 38 receives live traffic at step 73 from each of the devices 16 in communication with the backend server(s) 14. At step 74 the RS 28 extracts parameters from the received traffic to maintain the global model $M_G$ at step 76. At step 77 the RS uses the global model $M_G$ to obtain correlation score $d_L$ (e.g., $p(r_t)$) and classify traffic to detect malicious traffic. In the case of $M_G$ being designed for anomaly detection the scoring of $d_G$ and subsequent classification decision may be performed in the same manner as the LS in respect of $d_L$. On the other hand, in the case of being trained by "interesting instances" of traffic, the RS determines $d_G$ and the subsequent classification in the following manner.

The following is an example of a classifier used as $M_G$, where $M_G$ is trained on "interesting instances". In this case, the RS receives many borderline instances and their anomaly scores, from all of the LSs.

A dataset is then created by the RS in the following way: Let x_i be an $i^{th}$ instance, x, of interesting traffic received by the RS from the LS s, where is an integer between 1 and N. The instance is a set of parameters extracted or relating to from the instance of traffic. The parameters may be any or more of the parameters described herein as used by the LS or any other characterizing parameters.

Let $d_L$ i be the anomaly score of x_i, determined by the local model $M_L$ at the LS from which x_i was received. Let z_i be a normalized score of $d_L$ such that if $d_L$ i is above the local model's threshold $\Phi_L$, then z_i is an increasingly large positive value, and if $d_L$ i is below the threshold $\Phi_L$, then z_i receives an increasingly negative value, and if $d_L$ i, i is directly on the threshold, then z_i receives a value of zero. Finally, let y_i be an anomaly label of x_i, wherein y_i=−1 if z_i ≤0 and y_i=+1 if z_i>0.

Next, a classifier is induced using (i) the instances x_i \in a set, X, of N instances, and (ii) their respective labels y_i \in a set, Y, of N labels. The classifier finds a general partition (borderline) within the N instances. Since X contains samples from many LSs, this border is generalized in the sense that it is based on traffic behavior from devices from all of the LSs. Given a set of instances X= (x_1, x_2, . . . x_N) and their respective labels Y= (y_1, y_2, . . . y_N) a machine learning classifier learns how to group/partition the instances in X based on the ground-truth provided in Y. This can be achieved using any machine learning algorithm/model, e.g., logistic regression, decision trees, SVMs, etc. During training, the model takes x_i as an input, and learns how to create y_i as the output. Later, during the prediction phase, a new instance x_i, is provided as an input to the model, and the model then predicts the label y_i for the input x_i, based on all that it has learned from the training phase (the data in X and Y).

Furthermore, if an anomaly detection algorithm is used instead of a classifier, the normalized scores z_i \in a set, Z, of N normalized scores can be used to weight the instances during the learning process. In such embodiments, it is decided during the learning phase how much influence each instance x_i will have on the learning process and z_i can be used for this purpose. This may be achieved, for example, with an artificial neural network (ANN). When an ANN is trained using stochastic gradient decent, a user can decide the learning rate (lr) with which the ANN will learn from each instance. Typically, lr is a constant for all instances. However, for embodiments herein lr can be based on z_i: a large positive value of z_i scales the learning rate down accordingly (since positive values mean that the instance is malicious, and we only want to learn from benign instances). Thus, when using an autoencoder neural network, the learning rate can be scaled down for more malicious instances and scaled up for more benign instances.

Once the global model $M_G$ has been trained, the trained $M_G$ model is transmitted to all LSs, and used by each LS, in conjunction with $M_L$, to predict whether a given instance, x, of new traffic in the subnet of the LS is of class +1 (malicious) or class −1 (benign).

Figure 4A:
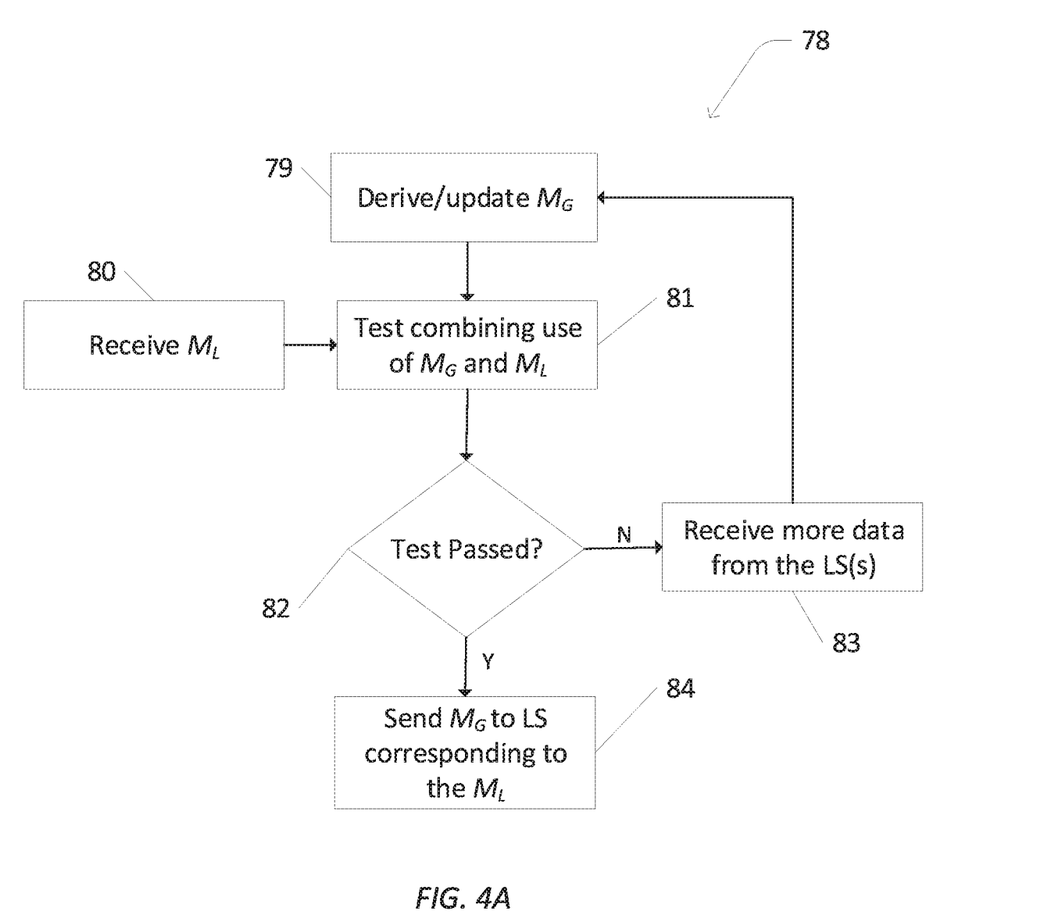
FIG. 4A is a flow diagram showing an exemplary method in which the global machine-learning is tested prior to its transmission.

In some embodiments, the process of deriving the $M_G$ at step 71 or updating it at step 76 may involve a verification method, such as method 78 depicted in FIG. 4A. In the method 78, the RS firstly attempts to derive/update $M_G$ at step 79. The RS also receives a copy of $M_L$ from a corresponding LS 26, as depicted by step 80. At step 81 the RS verifies $M_G$ by testing the combined use of $M_G$ and $M_L$ in the same manner as performed by the LS to derive a score d* and using an ensemble method, and based on d* decides whether the traffic is malicious, as described herein.

The result of the decision can be tested for accuracy, at step 82, by passing to the models instances of traffic that are known to be benign (i.e., have low scores), and detecting whether the sentinel produces are any false positives by classifying the traffic as anomalous (potentially malicious). Additionally or alternatively, known anomalous instances of traffic can be passed to the sentinel model to determine whether the sentinel fails to detect the anomaly.

If the test result is false, then at step 83 the RS waits for more training data (step 75 of method 70) and uses that training data and returns to step 79 to further train $M_G$. On the other hand, if the test result is true, the RS transmits $M_G$ to the LS from which the $M_L$ used for the test was received. In some embodiments, the RS transmits $M_G$ to the other LSs without further testing. However, in other embodiments, before sending $M_G$ to any given one of the other LSs the RS tests $M_G$ in the same manner as described above, using the $M_L$ corresponding to the given LS.

In addition to managing $M_G$, the RS also collects logs and alerts from the LSs, and provides a situational security overview for the administrator. From this information the RS or a network administrator may take any appropriate action as needed.

Example of Detecting of Malicious Activity based on $M_L$ and $M_G$

There will now be described some exemplary methods in which there is a combined use of $M_L$ and $M_G$ at the LS to detect malicious activity, such as in may be caused by the infection from as described above. The examples are respectively referred to herein as deferral, ensemble and deferred ensemble. In these examples, the method is performed by a local sentinel module.

The LS extracts the observation x (e.g., packet rate), from the network traffic. The observation x is then passed to $M_L$ and $M_G$ to produce decision scores $d_L$ and $d_G$ respectively. Each of the correlation scores are a function of $r_t$, or more precisely, a function of $r_t$ and their corresponding model. In this example, the scores represent a probability of a packet given rate being observed. Thus, $d_L=p(r_t, M_L)$ and $d_G=p(r_t, M_G)$. These scores are used to determine a final correlation score d*. There are several strategies for combining $d_L$ and $d_G$ to form d*, not limited to the following:

1. Ensemble:

This method involves determining the first correlation score, in this example $d_L$, based on a correlation between received traffic and the local model; and determining the second correlation score, in this example $d_G$, based on a correlation between received traffic the global model. The first correlation score $d_L$ and the second correlation score $d_G$ are then combined to determine d*.

For example, the LS calculates may combine $d_L$ and $d_G$ by determining the average of their correlation scores, a weighted vote, or using another known ensemble technique. The advantage with this approach is that both the local and global perspectives are leveraged, by using both $M_L$ and $M_G$ together, in a single correlation score d*.

Figure 5:
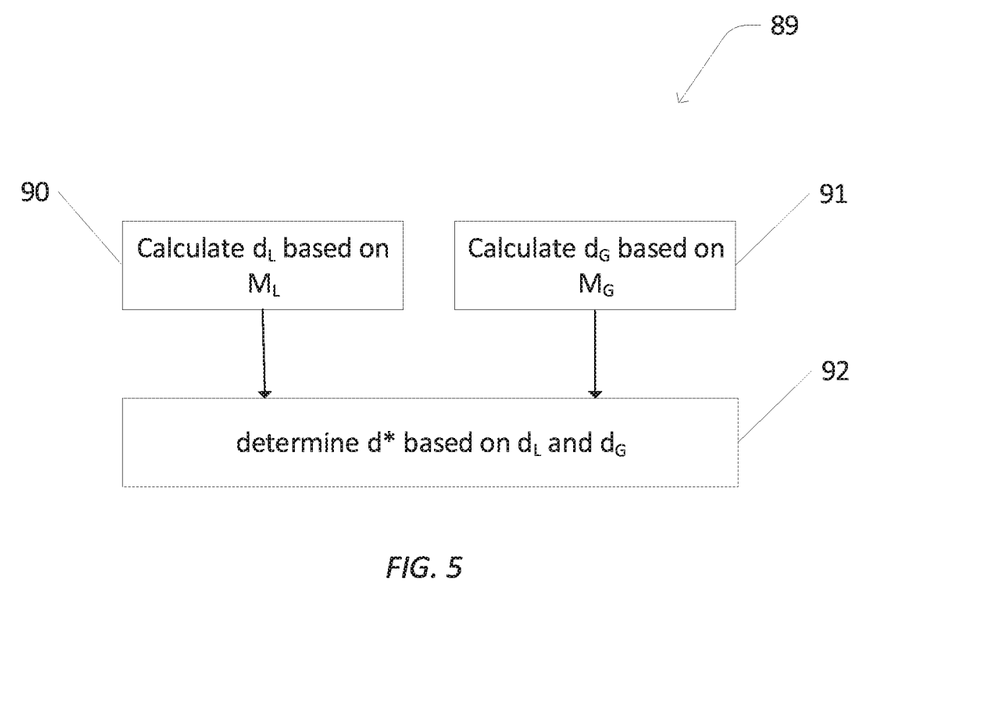
FIG. 5 is a flow diagram showing exemplary method, in accordance with another embodiment of the invention, showing an alternative process for combining use of a machine learning model maintaining a global machine-learning model.

An example ensemble method 89 is depicted in FIG. 5. At steps 90 and 91, the LS calculates the correlation scores $d_L$ and $d_G$ from $M_L$ and $M_G$, respectively. At step 92, the LS computes the naïve Bayesian probability $d*=d_L \times d_G$.

2. Deferral:

This method involves determining a first correlation, in this example $d_L$, based on a correlation between received traffic and the local model. In an event that the first correlation score satisfies a first predefined criterion (e.g., being less than a first threshold), a second correlation, in this case d*, is determined. The second correlation score d* is based on a correlation between received traffic the global model.

For example, the deferral method may include all of the steps of the previously exemplary method 50 to evaluate traffic based on $M_L$. As was discussed, if at step 66, the LS identifies $\Phi_L < d* \leq \Phi_L + E$, then at step 69 the LS factors in $M_G$ to determine d* to make a final decision. Thus the use of $M_G$ is deferred with respect to use of $M_L$. In this example, at step 69 the LS calculates $d_G$, and uses this as a final score d*.

An advantage of this approach compared with the ensemble approach is that $M_G$ is computationally expensive to execute, the deferred approach provides the opportunity reducing the number of computations in cases where the locally informed decision $d_L$, suffices.

3. Deferred Ensemble:

With this approach the LS combines both the deferred approach and the ensemble approach. This method involves determining a first correlation, in this example $d_L$, based on a correlation between received traffic and the local model. In an event that the first correlation score satisfies a first predefined criterion (e.g., being less than a first threshold), a second correlation score, in this case d*, is determined. Like the deferral method, the second correlation score d* is based on a correlation between received traffic the global model, but it is additionally based on a correlation between received traffic and at least the local model.

Specifically, the LS executes $M_L$ and then only executes the ensemble if $d_L$ does not have sufficient certainty. For example, the process deferred ensemble approach may the same as the deferred approach except that when the determining the final decision d*, rather than setting d* equal to $d_G$, the LS sets $d*=d_L \times d_G$.

Detection of Malicious Traffic Based on d*

Regardless of which of the methods is used to determine d*, once d* has been determined, the LS determine may decides whether there is malicious traffic according to d*. In an exemplary embodiment this is achieved according to process 100, depicted in FIG. 6.

Figure 6:
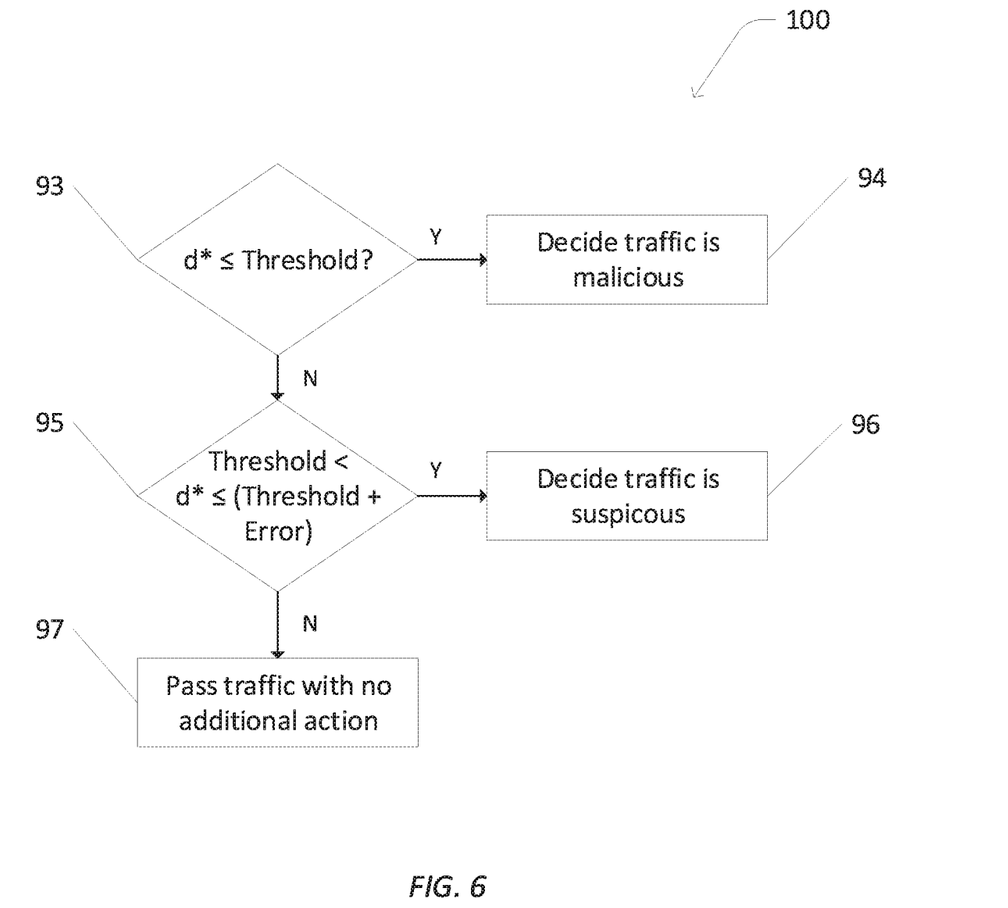
FIG. 6 is a flow diagram showing exemplary method handling traffic based on a combined use of a machine learning model maintaining a global machine-learning model, in accordance with FIG. 3 or FIG. 5.

Firstly, at step 93 the LS compares the score d* with threshold $\Phi*$ (e.g., $1 \times 10^{-7}$). If $d* \leq \Phi*$, then at step 94, the LS identifies the packet as being malicious and takes action according to predefined rules. For example, the LS may generate an alert, and send the alert to the RS, identifying the packet as malicious and providing an observation associated with the alert, the observation being the calculated score. This then allows appropriate action to be taken by the RS or administrator of the backend services 14. Alternatively, the RS may be configured to filter such packets.

Optionally, at step 95, the RS checks whether $\Phi* < d* \leq \Phi* + E*$, where E* is an error margin, which may optionally be set by a user. For example E* may be set to 0.001 if the scores represent probabilities. If it is, then at step 96, the LS identifies decides the traffic is suspicious, warranting further investigation. As a result of the traffic having initially been identified as suspicious, the LS sends an alert to the RS, identifying this traffic as being "interesting".

On the other hand, if $d* > \Phi* + E$, then at step 97, the LS decides the traffic is normal and allows the traffic to pass without any other action. In another embodiment, the LS skips step 95 comparing altogether and merely classifies the traffic as normal if step 93's test of whether d* is less than or equal to $\Phi*$ proved false.

Regardless of the strategy taken to produce d*, the LS sends the observation x, as an alert, to the RS (to maintain $M_G$) if x is considered 'interesting'. This may occur, for example, if d* has a low decision (certainty) score.

As will be understood from the embodiments, the interaction between the Local Sentinel and Global Sentinel may include:

1. Situational Awareness: The activity and status logs may be collected at each Local Sentinel and sent to the Remote Sentinel for processing. The logs are stored and used to provide the Administrator with a situational overview. For example, logs may be used to provide STEM functionality to the IoT Sentinels. For example, when a new protocol appears at a local distribution monitored by an LS, the $M_L$ at LS detects this as an anomaly and can be configured to drop such anomalous traffic. This alert is immediately sent to the RS. The RS then shows the administrator details of this alert (e.g., the attack type, the offender's IP address, etc.)
2. Field Intelligence: Local Sentinels send interesting instances (feature vectors representing packets) to the Remote Sentinel. These instances are used to improve the global model by adding to the pool of knowledge on which the global model is trained.
3. New Detection Methods: The global models are shared with the Local Sentinels to assist their efforts in fighting the threat. This may be achieved in a cascaded manner, wherein the global model is utilized when the Local Sentinel detects suspicious activity that requires further analysis, e.g., the deferred approach or the deferred ensemble approach. Alternatively the global model be applied simultaneously with local model when incoming traffic is first evaluated, e.g., the ensemble approach.

The terms "comprises", "comprising", "includes", "including", "having" and their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method of monitoring network traffic in a communication network with a sentinel module to detect malicious activity, the method comprising:
    using a gateway sentinel module to receive network traffic directed through a gateway installed for a local distribution of the network, the gateway connecting the local distribution of the network to a core of the network; and
    detecting malicious activity in the local distribution based on a combination of:
        a local machine-learning model for identifying malicious activity in the local distribution, the local machine-learning model modelling network traffic from the local distribution; and
        a global machine-learning model, the global machine-learning model modelling network traffic from a plurality of local distributions of the network based training data from a plurality of local sentinel modules executed on a respective plurality of computing nodes, the computing nodes respectively receiving network traffic from the plurality of local distributions;
    wherein said detecting malicious activity based on said combination of the local machine-learning model and the global machine-learning model comprises one of:
        (i) determining a first correlation score based on a correlation between received traffic and the local model,
            in an event that the first correlation score satisfies a first predefined criterion, determining a second correlation score, the second correlation score being based on a correlation between received traffic and at least the global model, and
            in an event that the second correlation score satisfies a second predefined criterion, deciding that the traffic is at least potentially malicious;
        and
        (ii) determining a first correlation score based on a correlation between received traffic and the local model,
            determining a second correlation score based on a correlation between received traffic the global model,
            combining the first correlation score and the second correlation score, and
            in an event that the combined correlation score satisfies a predefined criterion, deciding that the traffic is at least potentially malicious.

2. The method according to claim 1, wherein the method further comprises training the local machine-learning model based on received network traffic directed through a gateway.

3. The method according to claim 2, wherein training the local machine-learning model comprises at least one of:
    deriving the local machine-learning model based on training data extracted from network traffic directed through a gateway; and
    updating the local machine-learning model based on training data extracted from network traffic directed through a gateway.

4. The method according to claim 1, wherein the local machine learning model models network traffic from the local distribution by mapping, for at least one type of device connected to the gateway, a characteristic of traffic from the device.

5. The method according to claim 1, wherein the second correlation score is additionally based on a correlation between received traffic and the local model.

6. A method according to claim 1, wherein the method comprises:
    receiving the global machine-learning model from a remote computing node connected a Wide Area Network, the remote computing node using a remote sentinel module to manage the global machine-learning, the remote computing node being outside the local distribution.

7. A method according to claim 6, wherein the method comprises maintaining the global machine-learning model in the remote computing node, wherein maintaining the global machine-learning model comprises updating the machine learning-model based on the training data.

8. A method according to claim 6, wherein the method comprises:
    receiving, at the remote computing node, network traffic from each of the plurality of computing nodes;
    based on the global machine-learning model, detect malicious activity of the received network traffic from any one of the local distributions.

9. A method according to claim 6, wherein the method further comprises:
    based on at least the local machine-learning module, detecting unusual network activity in network traffic received by the gateway sentinel module; and
    instructing transmission of data relating to the unusual network activity to the remote computing node.

10. A method according to claim 1, wherein the method comprises:
    extracting a parameter set from network traffic received by the gateway sentinel module; and
    based on a relationship between the parameter set and at least the local machine learning model, deciding whether the network traffic from which the parameters was extracted is malicious.

11. A method according to claim 10, wherein the decision is based on an estimated probability of the parameter set occurring from non-malicious network activity.

12. A method according to claim 10, wherein extracted parameter set comprises at least one of: packet-rate; data-rate; and a highest frequency component of a frequency spectrum of the received data.

13. A method according to claim 10, wherein the parameter set consists of packet-rate.

14. A method according to claim 1, wherein the training data for maintaining the local-machine learning model comprises data from at least one device communicating with an Internet-of-Things (IoT) service.

15. A method according to claim 1, wherein the received network traffic is Internet-of-Things (IoT) traffic.

16. A communications device for monitoring network traffic in a communication network to detect malicious activity, the device comprising:
  a communications module for receiving network traffic between a core of the network and devices in a local distribution of the network;
  a memory for storing computer readable instructions; and
  a processor for executing the instructions, wherein upon executing the instructions, the processing is configured to:
    detect malicious activity in the local distribution based on a combination of:
      a local machine-learning model for identifying malicious activity in the local distribution, the local machine-learning model modelling network traffic from the local distribution; and
      a global machine-learning model, the global machine-learning model modelling network traffic from a plurality of local distributions of the network based training data from a plurality of local sentinel modules executed on a respective plurality of computing nodes, the computing nodes respectively receiving network traffic from the plurality of location distributions;
  wherein detecting said malicious activity based on said combination of the local machine-learning model and the global machine-learning model comprises one of:
  i) determining a first correlation score based on a correlation between received traffic and the local model,
    in an event that the first correlation score satisfies a first predefined criterion, determining a second correlation score, the second correlation score being based on a correlation between received traffic and at least the global model, and
    in an event that the second correlation score satisfies a second predefined criterion, deciding that the traffic is at least potentially malicious; and
  ii) determining a first correlation score based on a correlation between received traffic and the local model,
    determining a second correlation score based on a correlation between received traffic the global model,
    combining the first correlation score and the second correlation score, and
      in an event that the combined correlation score satisfies a predefined criterion, deciding that the traffic is at least potentially malicious.

17. A device according to claim 16, wherein the processor is further configured to:
  receive the global machine-learning model from a remote computing mode connected a Wide Area Network, the remote computing using a remote sentinel module to manage the global machine-learning, the remote computing node being outside the local distribution.

18. A device according to claim 16, wherein the processor is further configured to:
  based on at least the local machine-learning module, detect unusual network activity in the network; and
  instruct transmission of data relating to the unusual network activity to the remote computing node.

19. A method of monitoring network traffic in a communication network with a sentinel module to detect malicious activity, the method comprising:
  using a global sentinel module to receive network traffic between an Internet-of-Things (IoT) servicing system to a core of the network to communicate with IoT devices on a plurality of local distributions of the network;
  from the received network traffic, training a global machine-learning model modelling network traffic from a plurality of local distributions of the network; and
  instructing transmission of the global sentinel model to at least one of the local distributions for detecting malicious activity in the distribution based on a combination of the global machine-learning model and a local machine-learning model modelling network traffic from the local distribution;
  wherein said detecting said malicious activity based on said combination of the local machine-learning model and the global machine-learning model comprises one of:
  (i) determining a first correlation score based on a correlation between received traffic and the local model,
    in an event that the first correlation score satisfies a first predefined criterion, determining a second correlation score, the second correlation score being based on a correlation between received traffic and at least the global model, and
    in an event that the second correlation score satisfies a second predefined criterion, deciding that the traffic is at least potentially malicious; and
  (ii) determining a first correlation score based on a correlation between received traffic and the local model,
    determining a second correlation score based on a correlation between received traffic the global model,
    combining the first correlation score and the second correlation score, and
    in an event that the combined correlation score satisfies a predefined criterion, deciding that the traffic is at least potentially malicious.

20. A method according to claim 19, wherein the method further comprises verifying performance of the global sentinel model prior to instructing transmission of the global sentinel model to the at least one of the local distributions, wherein verifying the performance comprises:
  classifying the network traffic between the IoT servicing system and at least one of the local distributions based on a combination of the local machine-learning model and the global machine-learning model; and
  in an event that the classification meets a predefined condition, determining that the classification is correct.

21. A device for monitoring network traffic in a communication network to detect malicious activity, the device comprising:
  a memory for storing computer readable instructions; and
  a processor for executing the instructions, wherein upon executing the instructions, the processor is configured to:
    use a global sentinel module to receive network traffic between an Internet-of-Things (IoT) servicing system to a core of the network to communicate with IoT devices on a plurality of local distributions of the network;
    from the received network traffic, train a global machine-learning model modelling network traffic from a plurality of local distributions of the network; and
    instruct transmission of the global sentinel model to at least one of the local distributions for detecting malicious activity in the distribution based on a combination of the global machine-learning model and a local machine-learning model modelling network traffic from the local distribution;

wherein said detecting malicious activity based on said combination of the local machine-learning model and the global machine-learning model comprises one of:

(i) determining a first correlation score based on a correlation between received traffic and the local model, in an event that the first correlation score satisfies a first predefined criterion, determining a second correlation score, the second correlation score being based on a correlation between received traffic and at least the global model, and in an event that the second correlation score satisfies a second predefined criterion, deciding that the traffic is at least potentially malicious; and (ii) determining a first correlation score based on a correlation between received traffic and the local model, determining a second correlation score based on a correlation between received traffic the global model, combining the first correlation score and the second correlation score, and in an event that the combined correlation score satisfies a predefined criterion, deciding that the traffic is at least potentially malicious.

22. A non-transient computer readable medium storing instructions for execution by a processor wherein execution of the instructions by the processor causes the processor to perform the method according to claim 1.

23. A non-transient computer readable medium storing instructions for execution by a processor wherein execution of the instructions by the processor causes the processor to perform the method according to claim 19.

* * * * *